(12) United States Patent
Kamiyama

(10) Patent No.: US 11,591,022 B2
(45) Date of Patent: *Feb. 28, 2023

(54) PARKING ASSISTANCE DEVICE, PARKING ASSISTANCE METHOD, AND NON-TRANSITORY COMPUTER READABLE MEDIUM

(71) Applicant: PANASONIC INTELLECTUAL PROPERTY MANAGEMENT CO., LTD., Osaka (JP)

(72) Inventor: Hirotaka Kamiyama, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/675,514

(22) Filed: Feb. 18, 2022

(65) Prior Publication Data

US 2022/0169311 A1 Jun. 2, 2022

Related U.S. Application Data

(63) Continuation of application No. 16/867,119, filed on May 5, 2020, now Pat. No. 11,285,997, which is a
(Continued)

(30) Foreign Application Priority Data

Dec. 8, 2015 (JP) .............................. JP2015-239092

(51) Int. Cl.
*B62D 15/02* (2006.01)
*B60R 1/00* (2022.01)

(52) U.S. Cl.
CPC ............ *B62D 15/0295* (2013.01); *B60R 1/00* (2013.01); *B60R 2300/105* (2013.01);
(Continued)

(58) Field of Classification Search
CPC ................ B62D 15/028; B62D 15/021; B62D 15/0295; B60R 1/00; B60R 2300/305;
(Continued)

(56) References Cited

U.S. PATENT DOCUMENTS 6,411,867 B1 6/2002 Sakiyama
6,654,670 B2 11/2003 Kakinami
(Continued)

FOREIGN PATENT DOCUMENTS

EP 2163458 A2 3/2010
JP 2003-104149 4/2003
(Continued)

OTHER PUBLICATIONS

Mercedes 360 Degree Camera Hands on Review, URL: https://www.youtube.com/watch?v=xqbpqDZRd70.
(Continued)

*Primary Examiner* — Chico A Foxx
(74) *Attorney, Agent, or Firm* — Greenblum & Bernstein, P.L.C.

(57) ABSTRACT

A parking assistance device includes an imager that captures an image of a surrounding of a vehicle, and a display that displays a guidance image for guiding the vehicle from a parking start position to a target parking position and displays a moving area in which the vehicle can move during a parking operation. An area and dimension of the moving area displayed on the display changes based on a change in a steering angle of the vehicle.

8 Claims, 16 Drawing Sheets

Related U.S. Application Data continuation of application No. 16/566,352, filed on Sep. 10, 2019, now Pat. No. 10,683,035, which is a continuation-in-part of application No. 15/779,263, filed as application No. PCT/JP2016/005064 on Dec. 6, 2016, now Pat. No. 10,450,004.

(52) U.S. Cl.
CPC ... *B60R 2300/605* (2013.01); *B60R 2300/806* (2013.01); *B60R 2300/8086* (2013.01)

(58) Field of Classification Search
CPC ............. B60R 2300/806; B60W 30/06; G06K 9/00798
See application file for complete search history.

(56) References Cited

U.S. PATENT DOCUMENTS

| | | | |
|---|---|---|---|
| 7,257,486 | B2 | 8/2007 | Shimazaki |
| 7,375,651 | B2 | 5/2008 | Shimazaki |
| 7,940,193 | B2 | 5/2011 | Yamanaka |
| 8,319,614 | B2 | 11/2012 | Takano |
| 8,498,770 | B2 | 7/2013 | Takano |
| 8,855,850 | B2 | 10/2014 | Suzuki et al. |
| 8,890,716 | B2 | 11/2014 | Takano |
| 8,953,043 | B2 | 2/2015 | Kadowaki et al. |
| 9,233,712 | B2 | 1/2016 | Lee |
| 10,720,055 | B2 | 7/2020 | Matsuda |
| 10,919,574 | B2 * | 2/2021 | Kim ................ G05D 1/0061 |
| 2002/0041239 | A1 | 4/2002 | Shimizu |
| 2003/0030724 | A1 | 2/2003 | Okamoto |
| 2003/0080877 | A1 | 5/2003 | Takagi |
| 2005/0203704 | A1 | 9/2005 | Frank |
| 2006/0287826 | A1 | 12/2006 | Shimizu |
| 2007/0146166 | A1 | 6/2007 | Sato |
| 2007/0273554 | A1 | 11/2007 | Sakakibara |
| 2008/0077294 | A1 | 3/2008 | Danz |
| 2008/0094252 | A1 | 4/2008 | Uhler |
| 2008/0266137 | A1 | 10/2008 | Son |
| 2009/0278709 | A1 | 11/2009 | Endo |
| 2009/0303080 | A1 | 12/2009 | Kadowaki |
| 2010/0019934 | A1 | 1/2010 | Takano |
| 2010/0070139 | A1 | 3/2010 | Ohshia |
| 2010/0085170 | A1 | 4/2010 | Oleg |
| 2010/0219010 | A1 | 9/2010 | Kadowaki |
| 2010/0274474 | A1 | 10/2010 | Takano |
| 2010/0283633 | A1 | 11/2010 | Becker |
| 2010/0283634 | A1 | 11/2010 | Krautter |
| 2010/0286872 | A1 * | 11/2010 | Endo .................. B62D 15/027 701/41 |
| 2011/0181441 | A1 | 7/2011 | Ma |
| 2011/0210868 | A1 | 9/2011 | Yano |
| 2011/0298639 | A1 | 12/2011 | Kadowaki |
| 2012/0300075 | A1 | 11/2012 | Yamamoto |
| 2012/0314056 | A1 | 12/2012 | Michiguchi |
| 2013/0046441 | A1 | 2/2013 | Marczok |
| 2013/0050490 | A1 | 2/2013 | Kato |
| 2013/0060421 | A1 | 3/2013 | Kadowaki |
| 2013/0120161 | A1 | 5/2013 | Wakabayashi |
| 2013/0120578 | A1 | 5/2013 | Iga |
| 2013/0321634 | A1 * | 12/2013 | Okano ............... B62D 15/0295 348/148 |
| 2014/0052336 | A1 | 2/2014 | Moshchuk |
| 2014/0114529 | A1 | 4/2014 | An |
| 2014/0139677 | A1 | 5/2014 | Lambert |
| 2014/0148971 | A1 | 5/2014 | Sobue |
| 2014/0152774 | A1 | 6/2014 | Wakabayashi |
| 2014/0163862 | A1 | 6/2014 | Choi |
| 2014/0285665 | A1 | 9/2014 | Lee |
| 2014/0307083 | A1 | 10/2014 | Oh |
| 2014/0347195 | A1 | 11/2014 | Stempik |
| 2014/0354452 | A1 | 12/2014 | Okuyama |
| 2015/0057920 | A1 | 2/2015 | Von Zitzewitz |
| 2015/0197197 | A1 | 7/2015 | Watanabe |
| 2015/0258989 | A1 | 9/2015 | Okano et al. |
| 2015/0302261 | A1 | 10/2015 | Kiyohara |
| 2016/0023601 | A1 * | 1/2016 | Windeler ........... B62D 15/0275 348/118 |
| 2016/0075377 | A1 | 3/2016 | Tomozawa |
| 2016/0332575 | A1 | 11/2016 | Fukushima |
| 2017/0029027 | A1 | 2/2017 | Mizutani |
| 2017/0036695 | A1 | 2/2017 | Lee |
| 2017/0080976 | A1 | 3/2017 | Choi |
| 2017/0203789 | A1 | 7/2017 | Suda |
| 2019/0054927 | A1 | 2/2019 | Hayakawa |
| 2019/0096261 | A1 | 3/2019 | Hayashi |
| 2020/0062242 | A1 | 2/2020 | Hayakawa |

FOREIGN PATENT DOCUMENTS

| | | |
|---|---|---|
| JP | 2009-101989 | 5/2009 |
| JP | 2010-034645 A | 2/2010 |
| JP | 4900232 B | 3/2012 |
| WO | 2014/073193 | 5/2014 |

OTHER PUBLICATIONS

International Search Report of PCT application No. PCT/JP2016/005064 dated Feb. 7, 2017.
Notice of Reasons for Refusal in Japan dated Jul. 16, 2019 for the related Japanese Patent Application No. 2015-239092.
Chinese Office Action dated Dec. 9, 2019 for the related Chinese Patent Application No. 201680070726.X.
Decision of Refusal in Japan dated Mar. 3, 2020 for the related Japanese Patent Application No. 2015-239092.

* cited by examiner

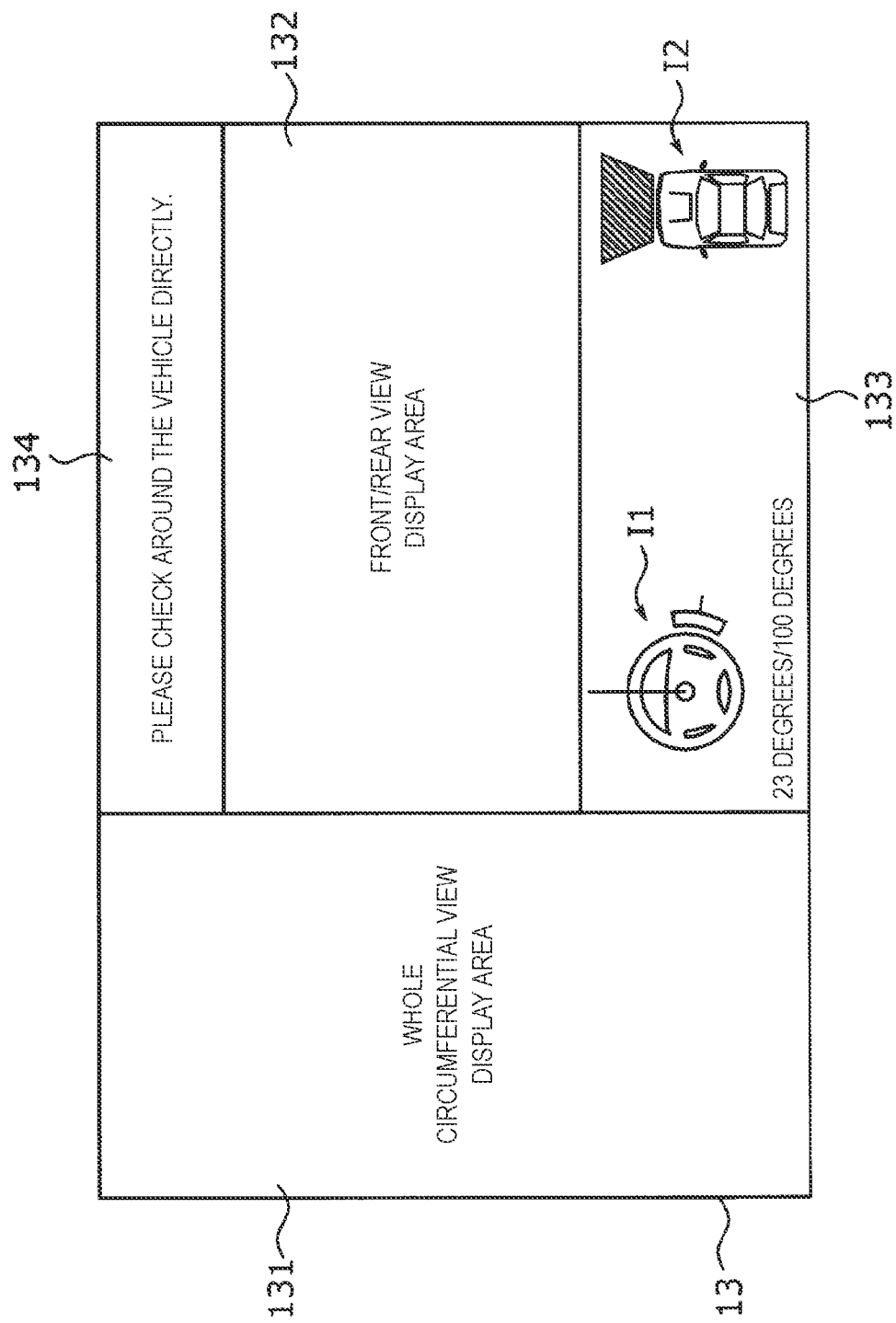

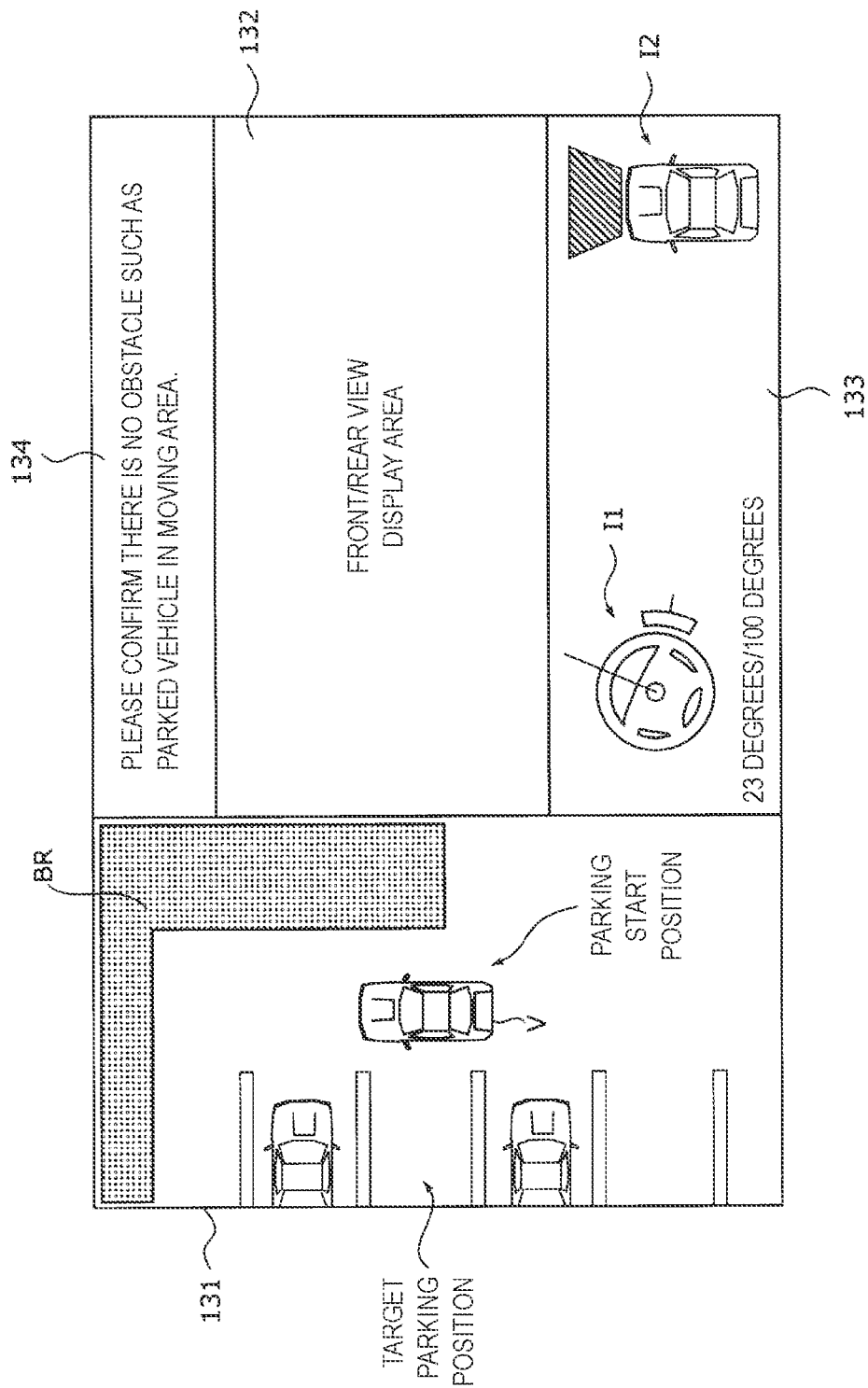

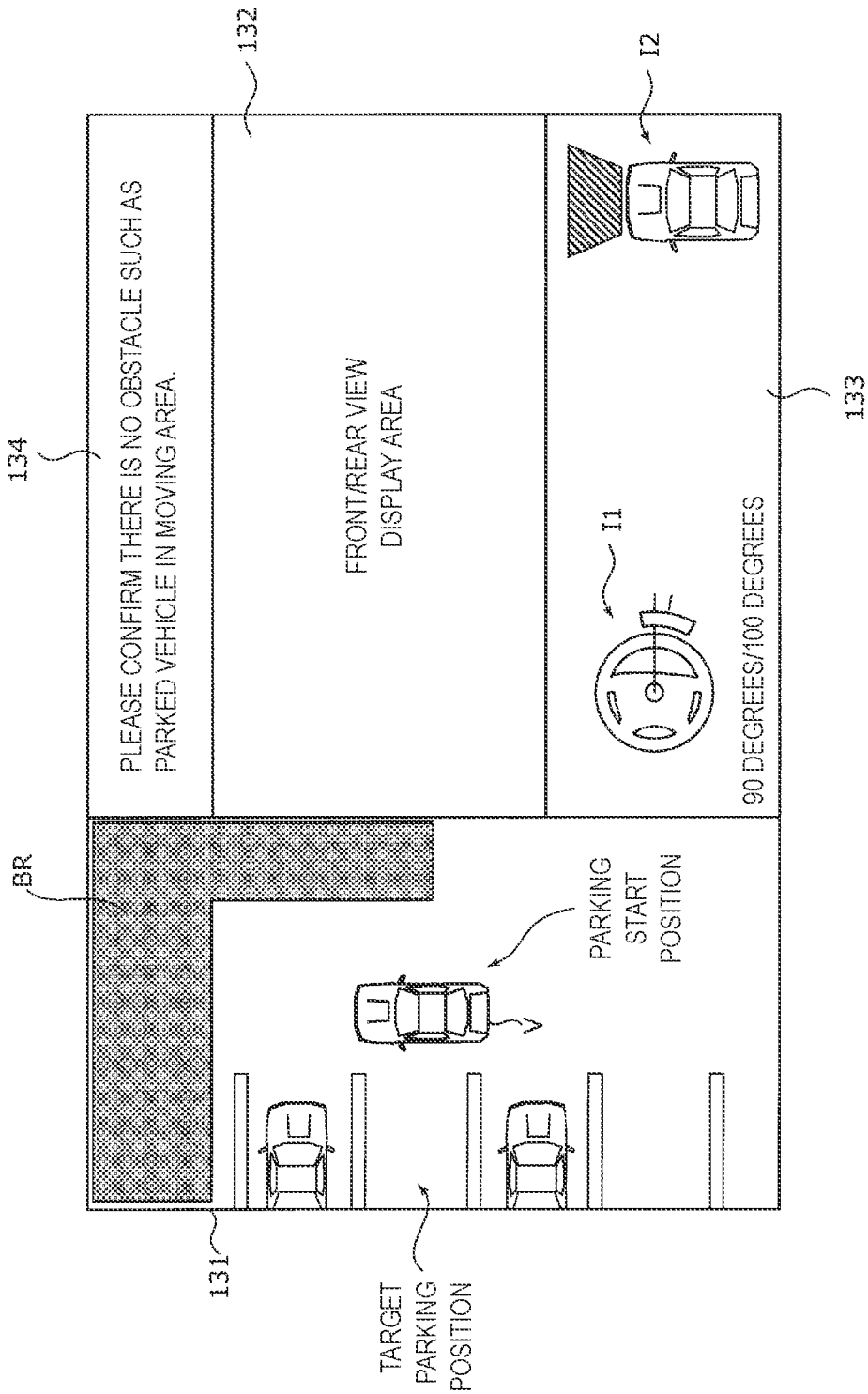

PARKING ASSISTANCE DEVICE, PARKING ASSISTANCE METHOD, AND NON-TRANSITORY COMPUTER READABLE MEDIUM

CROSS-REFERENCE TO RELATED APPLICATIONS

This is a continuation of U.S. patent application Ser. No. 16/867,119, filed May 5, 2020, which is a continuation of U.S. patent application Ser. No. 16/566,352, filed Sep. 10, 2019 and now U.S. Pat. No. 10,683,035, which is a continuation-in-part of U.S. patent application Ser. No. 15/779,263, filed May 25, 2018 and now U.S. Pat. No. 10,450,004, which is a National Phase application of International Pat. Appl. No. PCT/JP2016/005064, filed Dec. 6, 2016, and claims the benefit of Japanese Pat. Appl. No. 2015-239092, filed Dec. 8, 2015. The entire disclosure of each of the above-identified documents, including the specification, drawings, and claims, is incorporated herein by reference in its entirety.

BACKGROUND

1. Technical Field

The present disclosure relates to a parking assistance device, a parking assistance method, and a non-transitory computer readable medium storing a parking assistance program, for assisting a driving operation for parking a vehicle.

2. Description of the Related Art

Recently, a parking assistance device that assists a driving operation for parking a vehicle has been developed and put in practical use (for example, PLT 1). A parking assistance device, described in PLT 1, calculates a recommended backward movement start position from which an own vehicle can reach a target parking position while maintaining a steering angle, and displays, on a display unit, a backward movement start frame in addition to an own vehicle figure representing a position of the own vehicle and a parking target frame showing the target parking position, to thereby assist a driving operation for parking.

According to the parking assistance device described in Japanese Patent No. 4900232 (hereinafter referred as PLT 1), an own vehicle figure, a parking target frame, and a backward movement start frame are displayed as parking guidance. Therefore, a driver can easily recognize a target parking position and a recommended backward movement start position. By performing a driving operation according to the parking guidance, the driver can move the own vehicle to the target parking position and park the own vehicle.

SUMMARY

An object of the present disclosure is to provide a parking assistance device, a parking assistance method, and a non-transitory computer readable medium storing a parking assistance program that enable parking to be completed by a driving operation according to parking guidance, and enable driving efficiency for parking to be improved.

A parking assistance device according to the present disclosure includes an imager that captures an image of a surrounding of a vehicle, and a display that displays a guidance image for guiding the vehicle from a parking start position to a target parking position and displays a moving area in which the vehicle can move during a parking operation. An area and dimension of the moving area displayed on the display changes based on a change in a steering angle of the vehicle.

A parking assistance method according to the present disclosure includes receiving a captured image of a surrounding of a vehicle. The parking assistance method further includes displaying a guidance image for guiding the vehicle from a parking start position to a target parking position and a moving area in which the vehicle can move during a parking operation. The parking assistance method further includes changing an area and dimension of the displayed moving area based on a change in a steering angle of the vehicle.

A non-transitory computer readable medium according to the present disclosure recording a parking assistance program for causing a computer of a parking assistance device to perform processes of receiving a captured image of a surrounding of a vehicle; displaying a guidance image for guiding the vehicle from a parking start position to a target parking position and a moving area in which the vehicle can move during a parking operation; and changing an area and dimension of the displayed moving area based on a change in a steering angle of the vehicle.

According to the present disclosure, a parking route is set in consideration of presence or absence of an obstacle on the parking route. Therefore, a driver can complete parking by a driving operation according to the parking guidance. Accordingly, driving efficiency for parking is improved.

BRIEF DESCRIPTION OF DRAWINGS

FIG. 3 illustrates an example of a display screen of a display unit.

FIG. 15 illustrates an example of an obstacle area.

FIG. 16 illustrates another example of an obstacle area.

DETAILED DESCRIPTION OF PREFERRED EMBODIMENTS

Prior to the description of an exemplary embodiment of the present disclosure, a problem in a conventional device is briefly described. In a driving assistance device described in PLT 1, parking guidance is merely performed according to a parking route calculated at a parking start position, and presence or absence of an obstacle on the parking route is not considered. Therefore, when there is an obstacle on the parking route, a driving operation may not be performed according to the parking guidance. In that case, a parking route is reset when the driving operation cannot be performed. Accordingly, the operating efficiency for parking may be lowered. In the worst case, a parking route cannot be generated and the system may be interrupted.

Hereinafter, an exemplary embodiment of the present disclosure will be described in detail with reference to the drawings.

Figure 1:
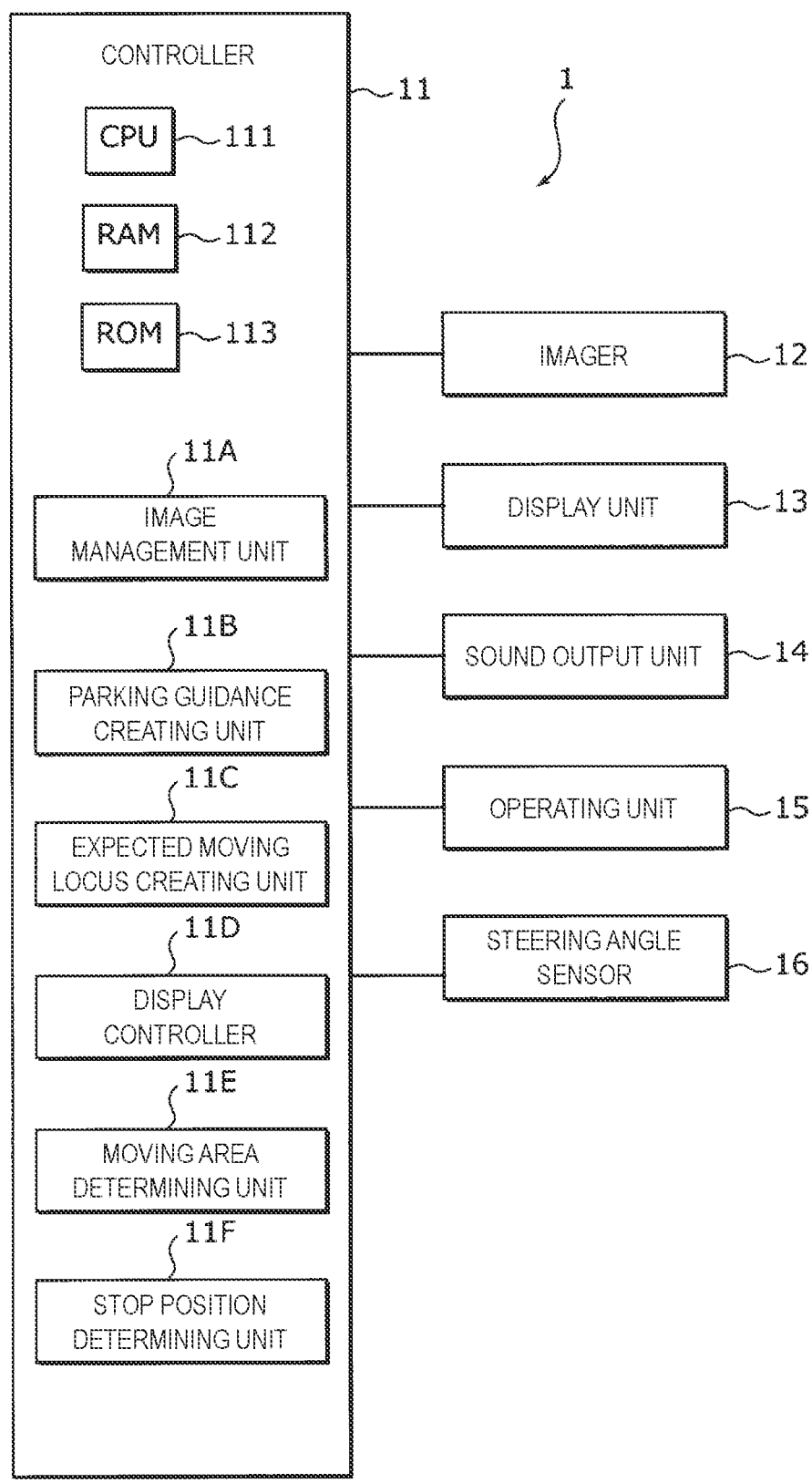
FIG. 1 is a diagram illustrating a configuration of a parking assistance device according to an exemplary embodiment.

FIG. 1 is a diagram illustrating a configuration of parking assistance device 1 according to the present exemplary embodiment. Parking assistance device 1 assists a driving operation for parking own vehicle V (see FIG. 2) at a target parking position. As illustrated in FIG. 1, parking assistance device 1 includes controller 11, imager 12, display unit 13, sound output unit 14, operating unit 15, steering angle sensor 16, and the like.

Controller 11 includes central processing unit (CPU) 111 as an arithmetic/control device, and random-access memory (RAM) 112 and read-only memory (ROM) 113 as main memories. CPU 111 reads from ROM 113 a program in accordance with a processing content, deploys the program in RAM 112, and controls respective blocks in cooperation with the deployed program.

ROM 113 stores, besides a basic program called a basic input output system (BIOS), a parking assistance program for assisting a driving operation for parking a vehicle. Specific functions of controller 11 will be described below.

Figure 2:
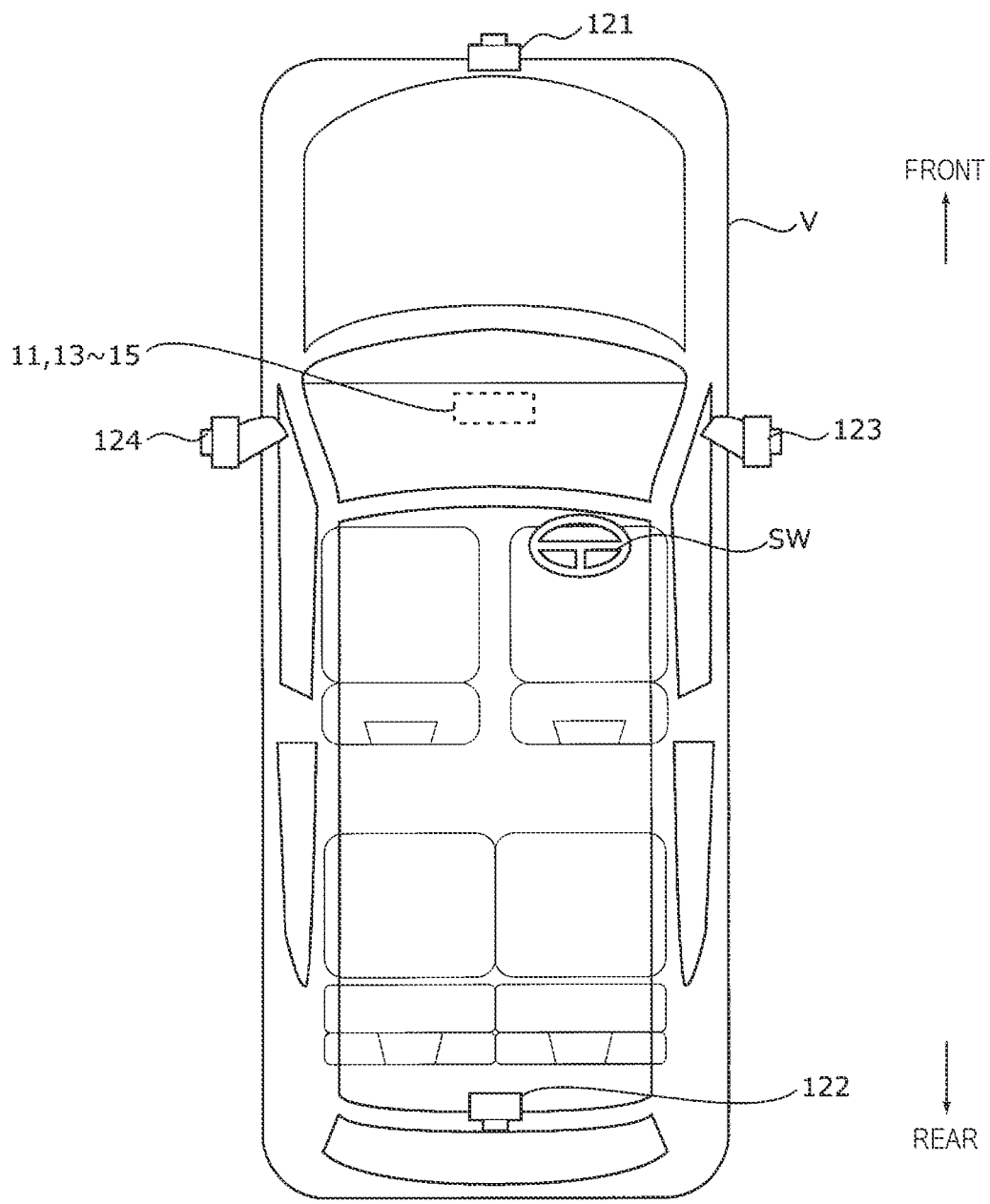
FIG. 2 illustrates a disposition state of on-vehicle cameras.

Imager 12 is at least one on-vehicle camera mounted on own vehicle V. As illustrated in FIG. 2, imager 12 includes front camera 121, rear camera 122, right-side camera 123, and left-side camera 124, for example. Each of on-vehicle cameras 121 to 124 is a wide angle camera having a field angle of about 180°, for example. On-board cameras 121 to 124 are disposed so as to image the whole circumference of own vehicle V.

For example, front camera 121 is provided on a front grille of own vehicle V, and captures an image of a front area in an obliquely downward direction toward the ground. Rear camera 122 is provided on a roof spoiler of own vehicle V and captures an image of a rear area in an obliquely downward direction toward the ground. Each of right-side camera 123 and left-side camera 124 is provided on a side mirror of own vehicle V, and captures an image of a side area in an obliquely downward direction toward the ground.

Display unit 13 is a display of a navigation system disposed on an instrument panel, for example. Display unit 13 displays an image for guiding own vehicle V to a target parking position. Sound output unit 14 is a speaker, for example, and outputs sound at the time of guiding own vehicle V to the target parking position.

Operating unit 15 includes a main switch for enabling a parking assistance function, a parking position setting button for setting a target parking position, a route determination button for determining a parking route, and a parking mode selection button for setting necessity of steering wheel actuation operation.

Steering angle sensor 16 detects a current steering angle of steering wheel SW.

Controller 11 functions as image management unit 11A, parking guidance creating unit 11B, expected moving locus creating unit 11C, display controller 11D, moving area determining unit 11E, and stop position determining unit 11F.

Image management unit 11A acquires an image captured by imager 12, and stores it temporarily. Further, image management unit 11A creates a whole circumferential view image by combining a plurality of images captured by imager 12.

Parking guidance creating unit 11B creates parking guidance information showing an ideal parking route, based on basic information including a current position (parking start position) of own vehicle V, a set target parking position, and a surrounding environment (presence or absence of an obstacle). The parking guidance information includes a steering position, a parking guide line, a target steering angle, and the like.

The steering position means a position at which a turn is made at the time of parking own vehicle V, including a backward movement start position or a steering wheel actuation operation position. The target steering angle means a steering angle for guiding own vehicle V to a moving target position including the steering position or the target parking position. This means that when the steering angle is set to the target steering angle, own vehicle V can be guided to the moving target position without any steering operation thereafter.

It should be noted that while parking guidance creating unit 11B creates parking guidance information when operating unit 15 performs an operation to set the target parking position, definitive parking guidance information is determined based on the steering angle when parking is started. The parking guidance information may also be finely adjusted when moving to the steering position is completed.

Expected moving locus creating unit 11C creates an expected moving locus based on the current position and the current steering angle of own vehicle V. The expected moving locus is a locus of the own vehicle when it moves in a state of keeping the current steering angle.

Display controller 11D controls a display mode of an image on display unit 13. Display controller 11D displays, on display unit 13, a guidance image for guiding own vehicle V to the target parking position, for example.

FIG. 3 illustrates an example of a display screen of display unit 13. As illustrated in FIG. 3, display unit 13 includes whole circumferential view display area 131, front/rear view display area 132, icon display area 133, and message display area 134.

Whole circumferential view display area 131 displays a whole circumferential view as if the vehicle is seen downward from the above. Such a view is created by combining images captured by imager 12. In whole circumferential view display area 131, stop icons indicating stop positions including a target parking position and a steering position are displayed in a superimposed manner on the captured images. Here, a stop icon includes letters "stop" and an image of a stop line.

Front/rear view display area 132 displays an image captured by front camera 121 or rear camera 122. The display image in front/rear view display area 132 is switched based on a traveling direction (gear position) of own vehicle V. In front/rear view display area 132, a parking guide line and an expected moving locus are displayed in a superimposed manner on the captured image.

In icon display area 133, icons I1, I2 representing information related to parking assistance are displayed. Icon I1 is an icon for instructing an angle of a steering wheel (hereinafter referred to as a "target steering angle") to be operated (hereinafter referred to as "steering icon I1"). Icon I2 is an icon showing an area displayed in front/rear view display area 132 (front side in FIG. 3).

In message display area 134, information related to parking assistance is displayed as a message. In message display area 134, a warning message for parking, a message instructing a driving operation that should be performed by a driver, a message informing completion of moving to a moving target position, and the like are displayed, for example. These messages are displayed in message display area 134, and are also output as sound from sound output unit 14.

Figure 4A:
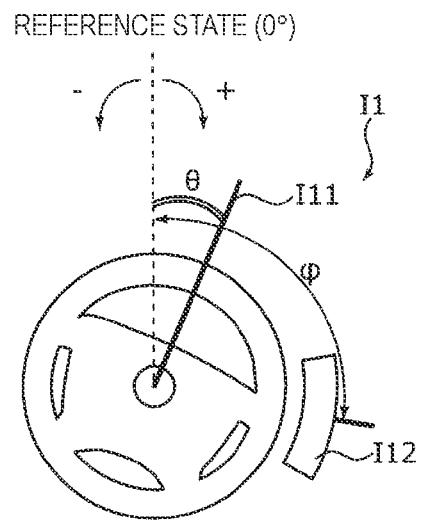
FIG. 4A illustrates a steering icon.
Figure 4B:
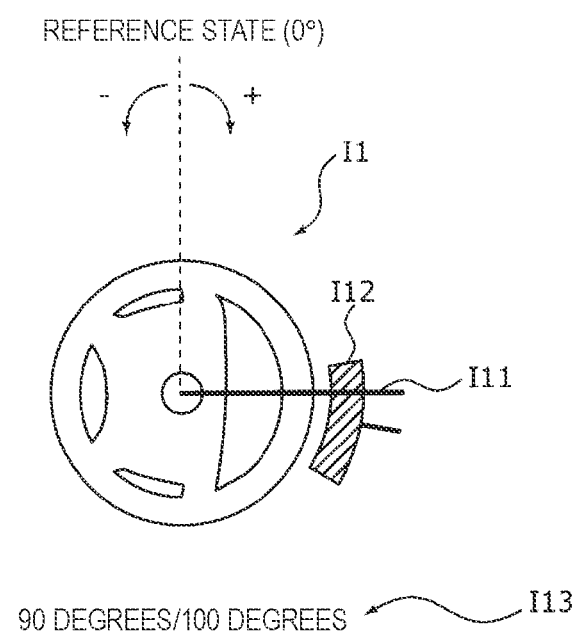
FIG. 4B illustrates a steering icon.

FIGS. 4A and 4B illustrate steering icon I1. FIG. 4A illustrates a case where current steering angle θ is 23 degrees, and target steering angle φ is 100 degrees. FIG. 4B illustrates a case where current steering angle θ is 90 degrees, and target steering angle φ is 100 degrees.

As illustrated in FIGS. 4A, 4B, steering icon I1 includes first icon I11 showing current steering angle θ, second icon I12 showing a given angle range around target steering angle φ, and third icon I13 showing current steering angle θ and target steering angle φ in numerical values.

In the present exemplary embodiment, steering angles θ, φ are indicated as a positive angle in a clockwise direction and a negative angle in a counterclockwise direction, with a state of steering wheel SW in straight traveling being used as a reference (0°).

First icon I11 includes an image of a steering wheel and an index line indicating steering angle θ, for example. Second icon I12 is an arcuate band image along an outer circumference of the steering wheel of first icon I11, for example, and may include an index line indicating target steering angle φ.

First icon I11 and third icon I13 (numerical values representing current steering angle θ) vary as steering wheel SW is operated. Second icon I12 is set based on the current position and the moving target position of own vehicle V. With second icon I12, a driver can intuitively recognize how much he/she should operate steering wheel SW.

Further, with third icon I13, as current steering angle θ and target steering angle φ are represented as numerical values, it is possible to prevent an operating direction of the steering wheel from being recognized erroneously. Even in a case where the target steering angle θ is 360 degrees or larger, recognition can be made reliably.

The given angle range around target steering angle φ is ±20°, for example. When steering angle θ is within a range of ±20°, the steering angle of a tire can be considered to be almost the same. Accordingly, own vehicle V can be guided to the moving target position. It is only necessary that the given angle range is a range in which a steering angle of a tire corresponding to steering angle θ can be deemed to be similar. The given angle range may be set appropriately depending on a vehicle on which parking assistance device 1 is mounted.

It is preferable that a display mode of second icon I12 be changed according to current steering angle θ. For example, a display color is controlled to be changed such that the color is "red" when current steering angle θ is largely deviated from target steering angle φ, the color is "yellow" when it comes close to target steering angle θ, and the color is "green" when it enters the given angle range. Thereby, the driver can easily recognize how much he/she should further operate steering wheel SW.

In conjunction with a change in the display mode of second icon I12, a display mode of third icon I13 may be changed. The display mode to be changed is not limited to the display color. The display mode can be changed from lighting display to flicking display (or from flicking display to lighting display), for example.

Figure 5:
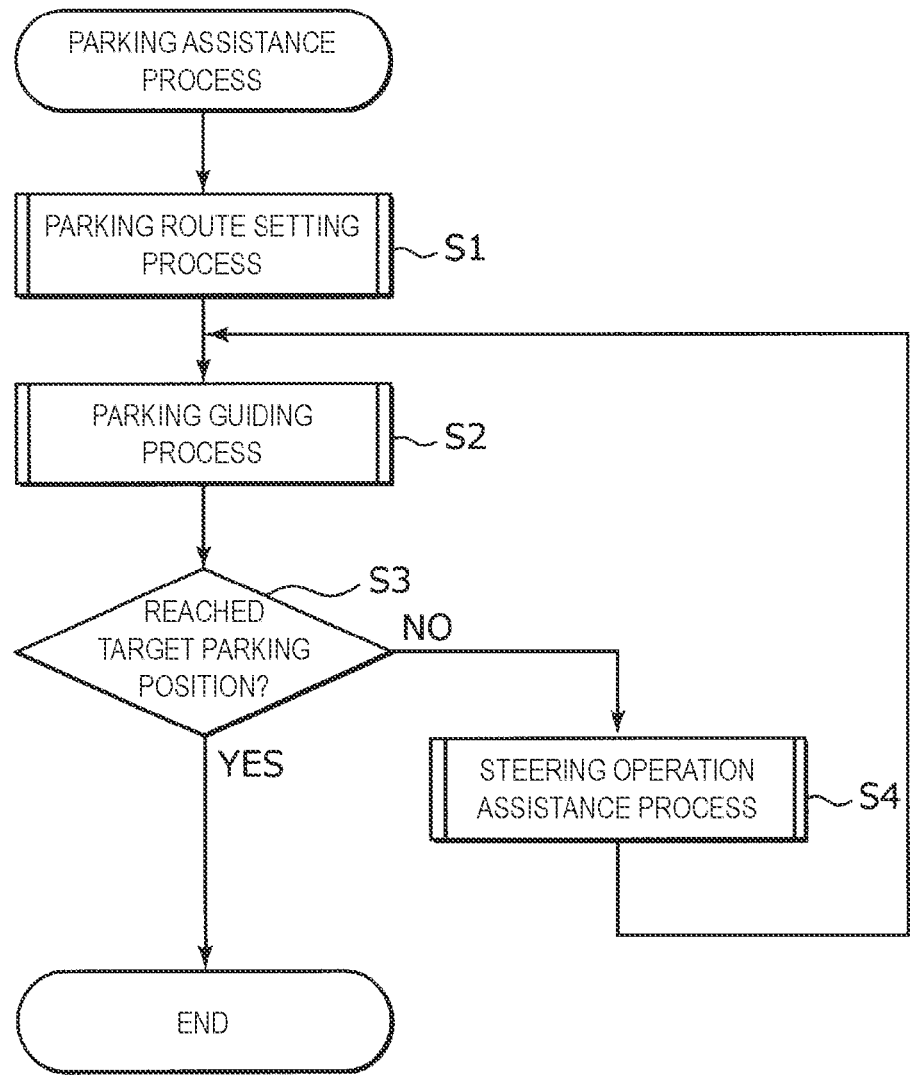
FIG. 5 is a flowchart illustrating an example of a parking assistance process.

FIG. 5 is a flowchart illustrating an example of a driving assistance process performed by controller 11. This process is realized when CPU 111 calls out a parking assistance program stored in ROM 113 and executes it, along with an operation by a driver in operating unit 15, for example.

Figure 9A:
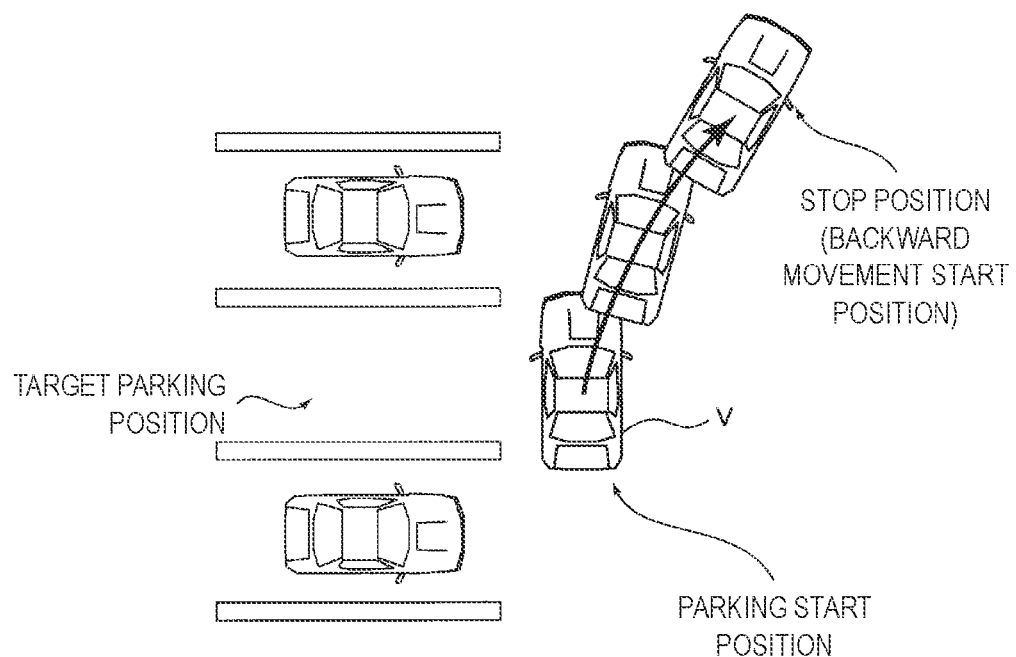
FIG. 9A illustrates an example of a parking operation.
Figure 9B:
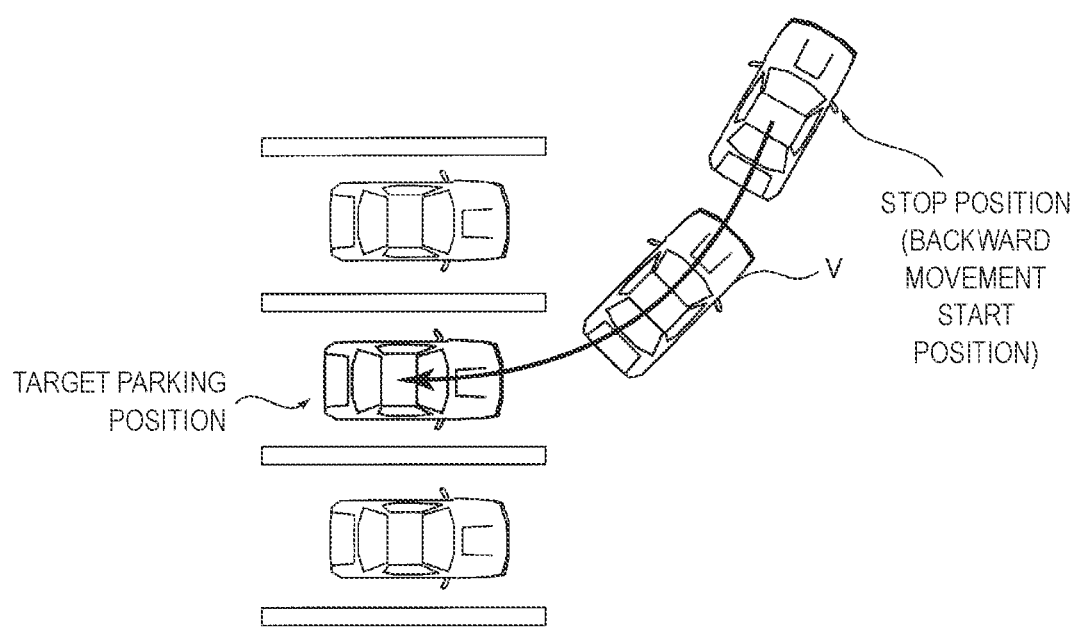
FIG. 9B illustrates an example of a parking operation.

Here, specific description will be given on a parking operation of a case where after own vehicle V is moved from a parking start position to a backward movement start position as illustrated in FIG. 9A, own vehicle V is moved to a target parking position and parked in perpendicular parking, as illustrated in FIG. 9B.

In step S1 of FIG. 5, controller 11 performs a parking route setting process. Specifically, the parking route setting process is performed according to the flowchart of FIG. 6.

Figure 6:
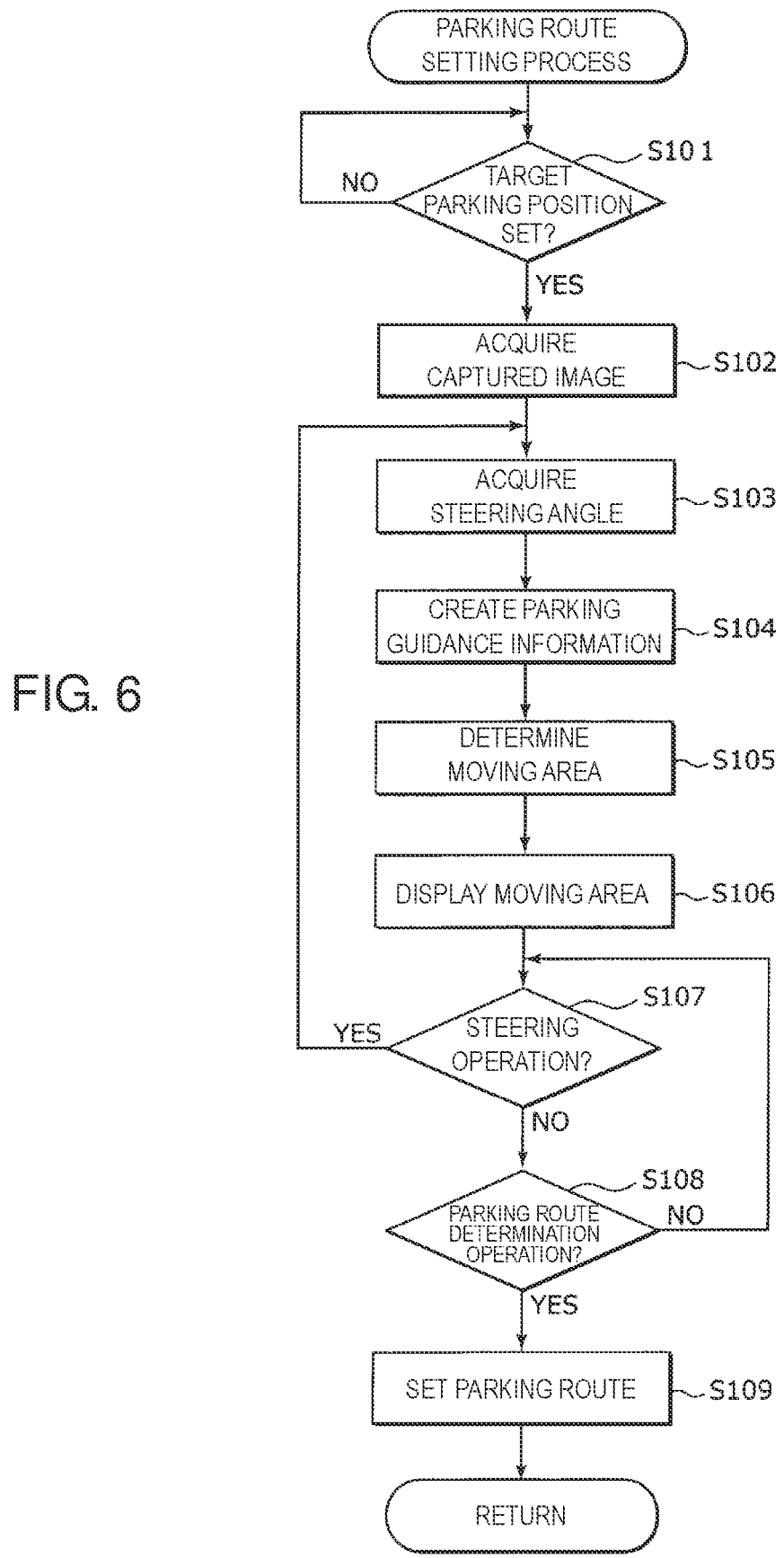
FIG. 6 is a flowchart illustrating an example of a parking route setting process.

That is, in step S101 of FIG. 6, controller 11 determines whether or not the target parking position is set by the driver. As illustrated in FIG. 9A, for example, the driver can set the target parking position by operating the parking position setting button of operating unit 15, in a state where the own vehicle is stopped at a side of the target parking position (parking start position). When the target parking position is set by the driver ("YES" in step S101), a process of step S102 starts.

Figure 10:
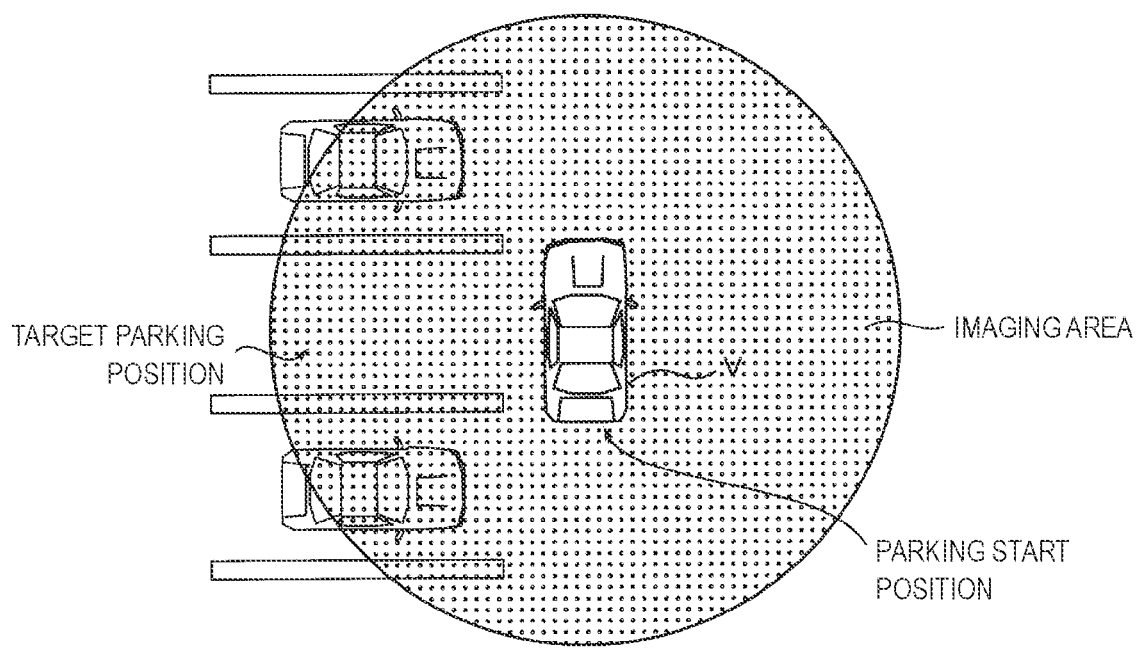
FIG. 10 illustrates an imaging area.

In step S102, controller 11 acquires an image captured by imager 12 (a process as image management unit 11A). Imager 12 images an imaging area illustrated in FIG. 10, for example. Even after step S102, controller 11 sequentially acquires images captured by imager 12.

In step S103, controller 11 acquires a current steering angle based on a detection result of steering angle sensor 16.

In step S104, controller 11 creates parking guidance information for guiding own vehicle V from the parking start position to the target parking position (a process as parking guidance creating unit 11B). Specifically controller 11 creates a whole circumferential view image and calculates an ideal parking route (hereinafter referred to as "a first parking route"), based on basic information including a current position (parking start position) of own vehicle V, the set target parking position, and a surrounding environment (presence or absence of an obstacle), for example.

Controller 11 also calculates a parking route to be used for actual parking guidance (hereinafter referred to as a "second parking route"), based on the basic information and the current steering angle.

Here, whether or not steering wheel actuation operation is required is also determined by controller 11. In the case of the parking operation illustrated in FIGS. 9A, 9B, a parking route in which a steering position (backward movement start position) is set as a moving target position, and a parking route in which the target parking position is set as a moving target position, are calculated.

In step S105, controller 11 specifies a moving area when own vehicle V moves according to the second parking route (a process as moving area determining unit 11E). The moving area is an area in which own vehicle V can move according to the second parking route, and is calculated in consideration of a whole length and a vehicle width of own vehicle V.

Figure 11:
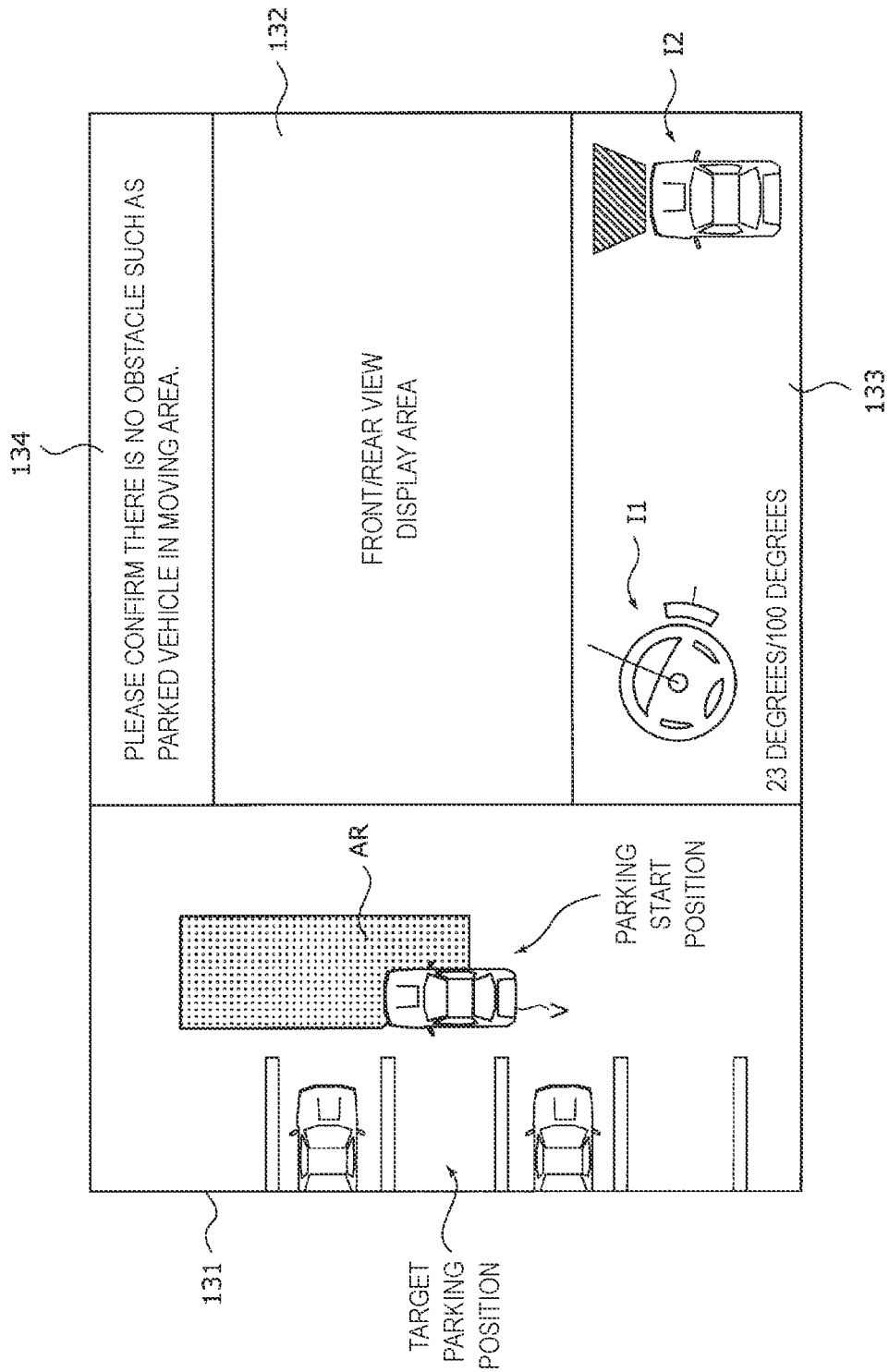
FIG. 11 illustrates an example of a moving area.
Figure 12:
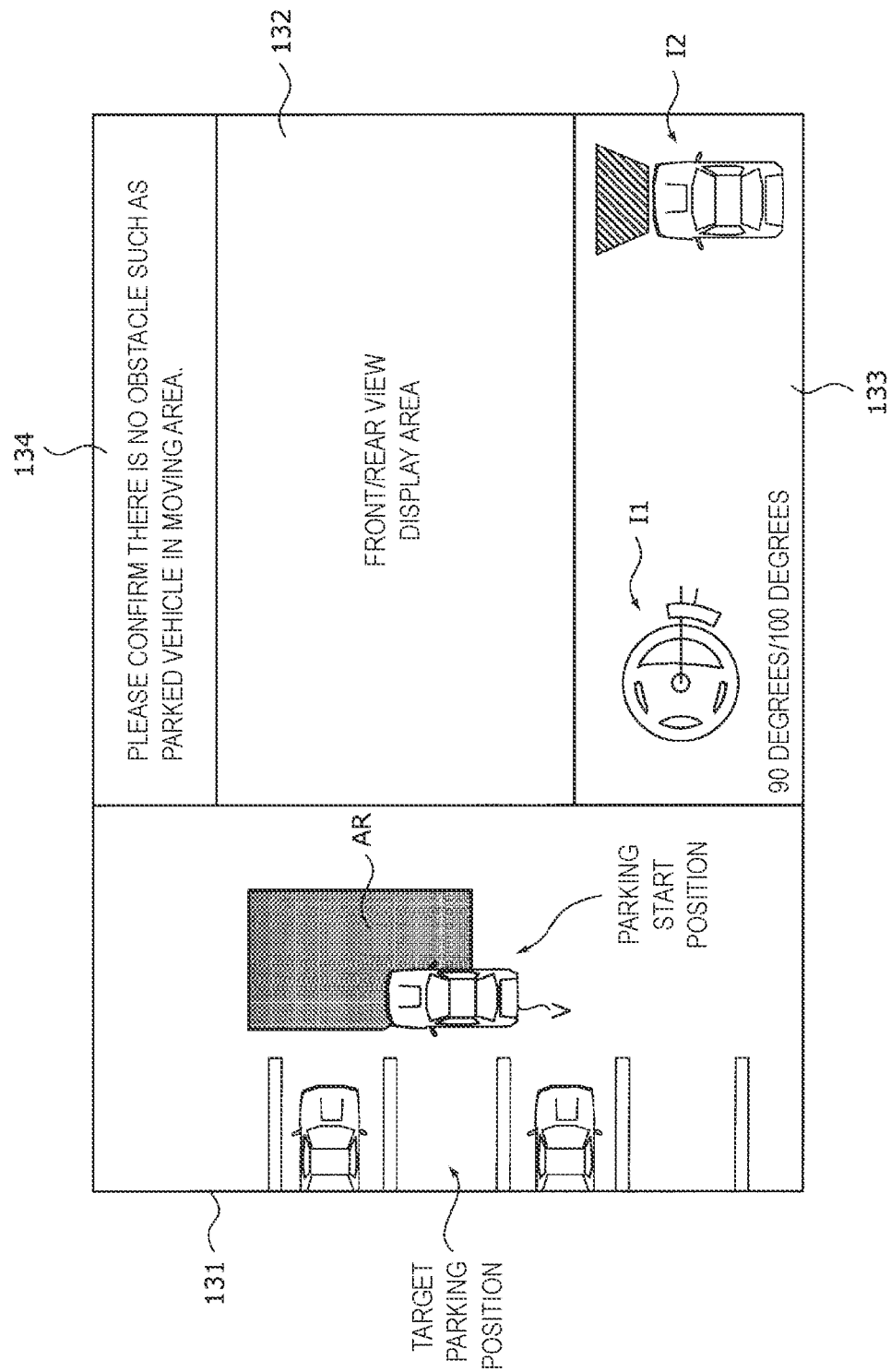
FIG. 12 illustrates another example of a moving area.

In step S106, controller 11 displays moving area AR together with the current position of own vehicle V, in whole circumferential view display area 131 (see FIGS. 11, 12). At that time, it is preferable to change the display mode (display color, for example) of moving area AR, depending on a number of steering wheel actuation operation included in the parking guidance information. Thereby, the driver can recognize easiness of the parking operation, based on the display mode of moving area AR. It should be noted that while moving area AR is illustrated as a simple figure in FIGS. 11 and 12, it is actually a much more complicated figure. Further, while FIGS. 11, 12 illustrate moving area AR, it is also possible to display a figure of obstacle area BR having an obstacle, on the contrary, as illustrated in FIGS. 15, 16.

In message display area 134, a message prompting to confirm that there is no obstacle such as a parked vehicle in moving area AR. This message is also output from sound output unit 14. The driver confirms whether there is no obstacle in moving area AR. In a case where there is an obstacle in moving area AR, parking operation cannot be completed with the second parking route calculated based on current steering angle θ. Therefore, the driver performs a steering operation to avoid the obstacle in moving area AR. In a case where obstacle area BR is displayed, the driver performs a steering operation such that there is no obstacle other than obstacle area BR.

At that time, in icon display area 133, it is possible to display steering icon I1 showing a steering angle for moving own vehicle V to the backward movement start position on the first parking route. Alternatively a steering operation assistance process, described below, may be performed. A steering operation is performed promptly such that current steering angle θ becomes target steering angle φ shown by steering icon I1, while presence or absence of an obstacle in moving area AR is checked.

In step S107, controller 11 determines whether or not a steering operation is performed. When the steering operation is performed ("YES" in step S107), the process of step S103 starts. When the steering operation is not performed ("NO" in step S107), a process of step S108 starts.

When the steering operation is performed, a second parking route is calculated anew based on steering angle θ after the operation, and moving area AR is updated. For example, when the steering operation is performed toward a positive side from the state illustrated in FIG. 11 and the steering angle is increased, moving area AR is updated such that the front side of own vehicle V is reduced and the right side thereof is expanded, as illustrated in FIG. 12. In a case of displaying obstacle area BR, the front side of own vehicle V is expanded and the right side thereof is reduced.

In step S108, controller 11 determines whether or not the driver performs an operation to determine a parking route (operation of a parking route determination button, for example). When the operation to determine the parking route is performed ("YES" in step S108), a process of step S109 starts. When the operation to determine the parking route is not performed ("NO" in step S108), the process of step S107 starts. The driver recognizes moving area AR that varies according to a steering operation, and confirms that there is no obstacle interrupting the parking operation on the second parking route. Then, the driver fixes the parking route. In a case of displaying obstacle area BR, the driver recognizes obstacle area BR that varies according to a steering operation, and confirms that there is no obstacle interrupting the parking operation in an area other than obstacle area BR on the second parking route. Then, the driver fixes the parking route.

In step S109, controller 11 sets the second parking route when the determination operation is performed by the driver, to be a parking route for which parking guidance is provided. Parking guidance is provided according to the set second parking route. When the parking route setting process ends, a process of step S2 of FIG. 5 starts.

In this way, a definitive parking route is set after confirming that there is no obstacle interrupting the parking operation on the parking route when a steering operation for moving to the backward movement start position is performed. Accordingly, the parking operation according to the parking guidance is never interrupted by an obstacle.

In step S2 of FIG. 5, controller 11 performs a parking guiding process. Specifically, the parking guiding process is performed according to the flowchart of FIG. 7. Own vehicle V is guided up to the backward movement start position by the parking guiding process from the parking start position, and is guided up to the target parking position by the parking guiding process from the backward movement start position.

Figure 7:
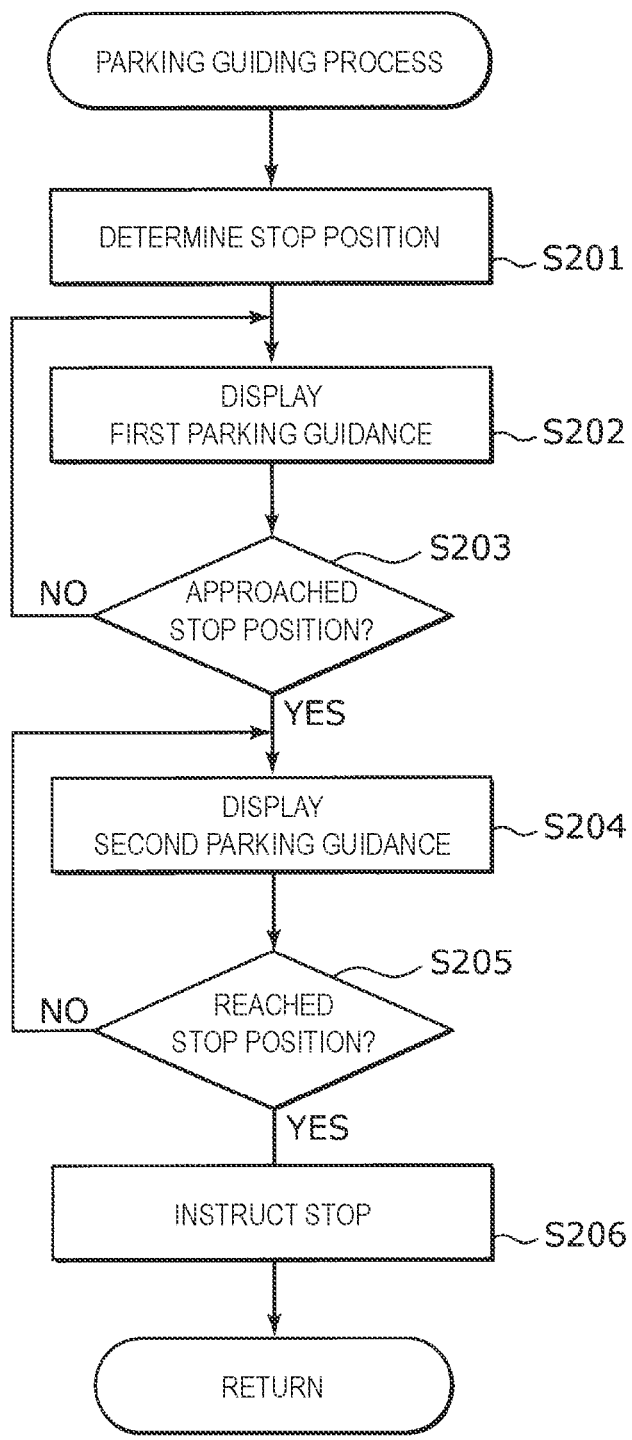
FIG. 7 is a flowchart illustrating an example of a parking guiding process.

That is, in step S201 of FIG. 7, controller 11 specifies a parking position based on the set parking route (a process as stop position determining unit 11F). The stop position is equivalent to the moving target position, and includes the backward movement start position, the steering wheel actuation operation position, or the target parking position. In the parking guiding process, display/non-display of a stop icon at the specified stop position is controlled according to an approaching state of own vehicle V relative to the stop position.

Figure 13:
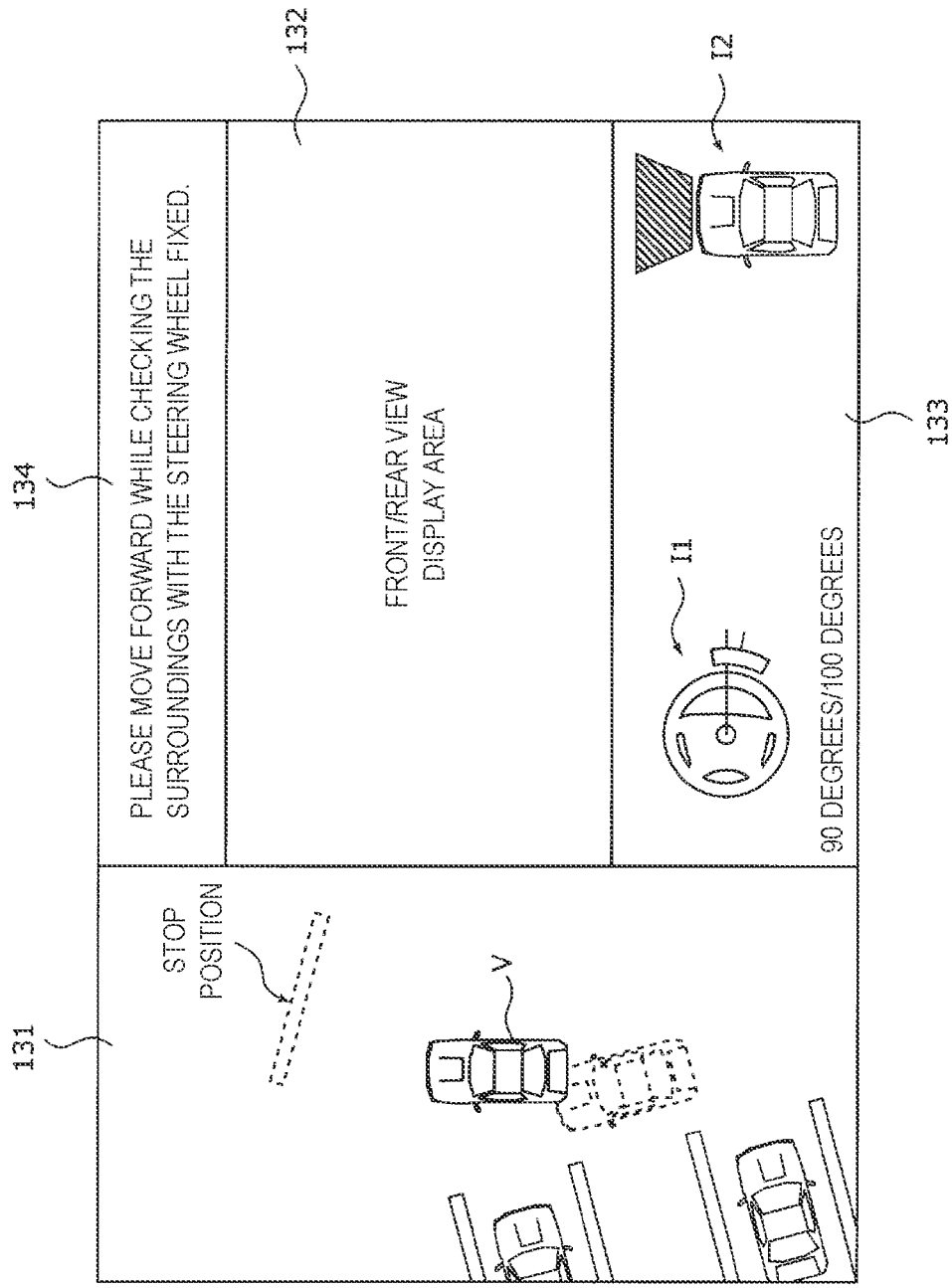
FIG. 13 illustrates an exemplary display for guiding parking.

In step S202, controller 11 displays first parking guidance without any stop icon. That is, after the parking operation is started from the parking start position toward the backward movement start position (stop position), or after the parking operation is started from the backward movement start position toward the target parking position, the stop icon is not displayed for a given period (see FIG. 13).

In message display area 134, a message prompting a forward movement with the steering wheel being fixed is displayed. This message is also output from sound output unit 14. According to this instruction, a forward moving operation or a backward moving operation is started promptly. When the forward movement or the backward movement is started, own vehicle V smoothly moves toward the moving target position. Displays in whole circumferential view display area 131 and front/rear view display rea 132 are changed as own vehicle V moves.

In step S203, controller 11 determines whether or not own vehicle V has approached the stop position. For example, when an approaching distance of own vehicle V to the stop position is about 1.0 m, it is determined that own vehicle V has approached the stop position. When own vehicle V has approached the stop position ("YES" in step S203), a process of step S204 starts. When own vehicle V has not approached the stop position ("NO" in step S203), the process moves to step S202.

Figure 14:
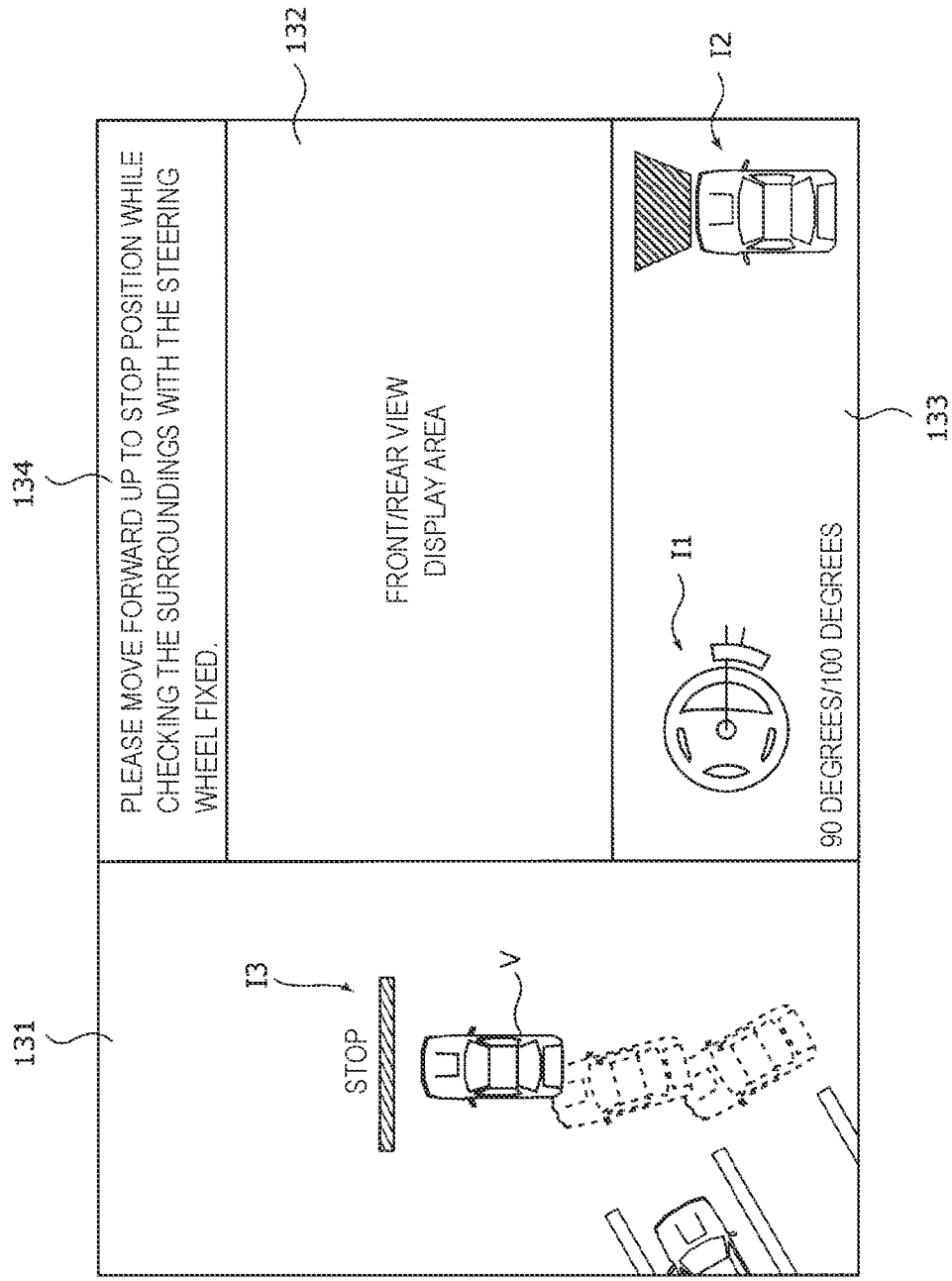
FIG. 14 illustrates another exemplary display for guiding parking.

In step S204, controller 11 displays second parking guidance with a stop icon. This means that when own vehicle V approaches the backward movement start position (stop position) to some extent, stop icon I3 appears for the first time (see FIG. 14).

After stop icon I3 is displayed, a display color or transparency may be changed such that the visibility thereof is gradually improved according to an approaching state of own vehicle V toward the stop position. Specifically, it is possible to change the icon from a less visible mode (pale color display, high transparency) to an easily visible mode (deep color, low transparency) as the approaching distance becomes closer. It is also possible to inform the approaching state of the own vehicle toward the stop position by an informing unit other than display unit 13. As the informing unit, sound output unit 14 is applicable, for example. Further, a vibrator (not illustrated) that vibrates a seat or the steering wheel is also applicable.

In message display area 134, a message prompting to stop at the position of stop icon I3 is displayed. This message is also output from sound output unit 14. Thereby, the driver watches the stop position in the parking guidance, and stops traveling at a point when own vehicle V reaches the parking position.

As described above, stop icon I3 is not displayed from the beginning of the parking operation, but is displayed only when own vehicle V approaches the stop position. Thereby, the driver does not watch only the parking guidance in an attempt to make the own vehicle follow the stop icon from the beginning of the parking operation. Accordingly, the driver can sufficiently watch surrounding obstacles not displayed, whereby the safety is improved.

In step S205, controller 11 determines whether or not own vehicle V has reached the stop position. As illustrated in FIGS. 9A and 9B, when own vehicle V moves forward from the parking start position to the backward movement start position, the backward movement start position is the stop position. Meanwhile, when own vehicle V moves backward from the backward movement start position to the target parking position, the target parking position is the stop position. Whether or not own vehicle V has reached the stop position can be determined based on an imaging result by imager 12, for example. When own vehicle V has reached the stop position ("YES" in step S205), a process of step S206 starts. When own vehicle V has not reached the stop position ("NO" in step S205), the process moves to step S204.

In step S206, controller 11 displays a message prompting a stop in message display area 134, and also outputs it from sound output unit 14. Thereby, the driver performs a stop operation, and own vehicle V stops at the stop position. When the parking guiding process ends, a process of step S3 in FIG. 5 starts.

In step S3 of FIG. 5, controller 11 determines whether or not own vehicle V has reached the target parking position. Whether or not own vehicle V has reached the target parking position can be determined based on an imaging result by imager 12, for example. When own vehicle V finally has reached the target parking position ("YES" in step S3), a fact that the vehicle has reached the target parking position is informed, and the parking assistance process ends. At that time, it may instruct to return the steering wheel to a reference state and move straight backward to complete the parking operation.

On the other hand, when own vehicle V has not reached the target parking position ("NO" in step S3), that is, when own vehicle V is in a state of reaching the steering position (backward movement start position or steering wheel actuation operation position), the process of step S4 starts, and a steering operation assistance process is performed. In that case, a fact that own vehicle V has reached the steering position is informed, and an instruction is given to switch the gear from forward movement to backward movement, or from backward movement to forward movement. Specifically, the steering operation assistance process is performed according to the flowchart of FIG. 8.

Figure 8:
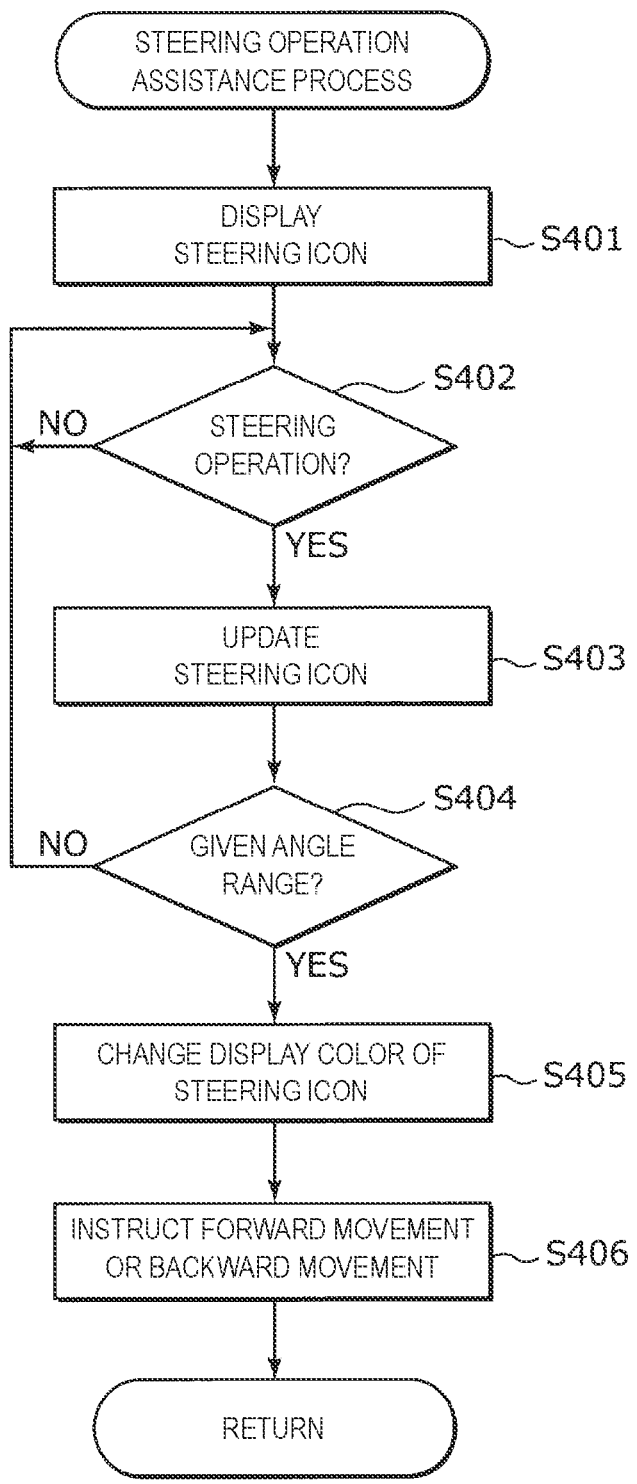
FIG. 8 is a flowchart illustrating an example of a steering operation assistance process.

In S401 of FIG. 8, controller 11 switches an image in front/rear view display area 132 along with a gear change operation by the driver, and updates an icon image in icon display area 133.

At that time, in message display area 134, a message instructing a steering operation for allowing steering angle θ to fall within a range shown by second icon I12 is displayed. With steering icon I1, the driver can easily recognize how much he/she should operate steering wheel SW. Thereby, the instructed steering operation is performed promptly.

In step S402, controller 11 determines whether or not the steering operation is performed by the driver. When the steering operation is performed by the driver ("YES" in step S402), a process of step S403 starts.

In step S403, controller 11 updates steering icon I1 along with the steering operation by the driver. Specifically, along with the steering operation by the driver, first icon I11 (an image of the steering wheel and an index line of steering angle θ) is turned, and a numerical value representing current steering angle θ of third icon I13 is changed.

In step S404, controller 11 determines whether or not steering angle θ falls within a given angle range. When steering angle θ falls within the given angle range ("YES" in step S404), a process of step S405 starts. When steering angle θ does not fall within the given angle range ("NO" in step S404), the process of step S402 starts.

In step S405, controller 11 changes the display mode (display color, for example) of second icon I12 and third icon I13. Thereby, the driver can easily recognize that current steering angle θ is in an appropriate state.

In step S406, controller 11 displays, in message display area 134, a message informing that steering angle θ is in the appropriate state and informing a start of parking guidance. When the steering operation assistance process ends, the process of step S2 of FIG. 5 starts. By the parking guiding process after the steering operation assistance process, own vehicle V is finally guided to the target parking position.

As described above, as target steering angle φ is displayed with an icon showing a range of a required operation amount of the steering wheel, the driver can intuitively recognize how much he/she should operate the steering wheel. Accordingly the driver can complete the required steering operation in a short time without being excessively conscious of target steering angle φ. Thereby, the driving efficiency for parking is improved.

As described above, parking assistance device 1 according to the present exemplary embodiment includes imager 12 that captures an image of a surrounding of own vehicle V, display unit 13 that displays a guidance image for guiding own vehicle V from a parking start position to a target parking position, parking guidance creating unit 11B that creates parking guidance information showing a parking route, based on basic information including an imaging result by imager 12, the parking start position, and the target parking position, moving area determining unit 11E that determines moving area AR in which own vehicle V can move, based on the parking guidance information, and display controller 11D that displays, on display unit 13, an image showing moving area AR together with the guidance image based on guidance information.

According to parking assistance device 1, a parking route is set in consideration of presence or absence of an obstacle on the parking route. Therefore, a driver can complete parking by a driving operation according to the parking guidance. Accordingly, driving efficiency for parking is improved.

Although the disclosure made by the present inventor has been specifically described above based on the exemplary embodiment, the present disclosure is not limited to the above exemplary embodiment, and can be modified without departing from the gist of the present disclosure.

For example, it is possible to allow a driver to select a parking mode involving steering wheel actuation operation or a parking mode not involving steering wheel actuation operation. In that case, parking assistance device 1 calculates an ideal parking route according to the selected parking mode. It is also possible that after a target parking position is set at a parking start position, the own vehicle moves without parking guidance up to a backward movement start position, and then parking guidance starts from the backward movement start position.

The present disclosure is applicable not only to a case of performing perpendicular parking but also to a case of performing parallel parking in which a large number of steering wheel actuation operation is expected.

Furthermore, moving area AR may be displayed by lines that indicate the outside edges or periphery of moving area AR. For example, moving area AR may be displayed by frame-shaped straight lines that surround moving area AR. Alternatively, moving area AR may be displayed by a pair of straight lines that sandwich moving area AR along a width direction of own vehicle V or along a traveling direction of own vehicle V. Furthermore, the lines that indicate the outside edges or periphery of moving area AR are not limited to straight lines, and may be curved lines. In the case where moving area AR is displayed by the lines, inner area of moving area AR may be displayed with a color different from that of the outside edges or periphery of moving area AR. Such a color-coding allows moving area AR to be emphatically displayed.

Meanwhile, controller 11 may communicate with an external terminal and display moving area AR together with the current position of own vehicle V on a display of the external terminal. Such configuration can be used when a user performs parking assistance by operating the external terminal from outside of own vehicle V, for example, such as "remote parking". According to the configuration, the user can check moving area AR even when the user exists outside of own vehicle V. Therefore, the user can confirm whether or not there is no obstacle in moving area AR and moving area AR is safe for own vehicle V.

Moreover, moving area AR may include the second parking route and a possibly moving area. The second parking route is defined as a route of own vehicle from the parking start position to the target parking position and an area having a predetermined width along the route. The width is, for example, the vehicle width of own vehicle or slightly large of the vehicle width of own vehicle. The possibly moving area is defined as an area in which own vehicle may probably travel off of the second parking route. Own vehicle travels within the second parking route; however, does not necessarily travel within the possibly moving area. According to the configuration, the user can confirm whether or not there is no obstacle in the possibly moving area and the possibly moving area is safe for own vehicle V when own vehicle V becomes off of the second parking route. Examples of the case of traveling off of the second parking route include a case where it occurs due to a time lag between the braking timing requested to the user by the parking assistance device and the actual braking operation timing by the user. Note that moving area determining unit 11E only has to specify, as moving area AR, an area including the area defined as the second parking route and a predetermined area. The predetermined area may be determined in consideration of the whole length, the vehicle width, and the like of own vehicle V.

Furthermore, the guidance image only has to an image for guiding own vehicle V from the parking start position to the target parking position. For example, the guidance image may be a whole circumferential view image, a front view image, or a rear view image. Alternatively, the guidance image may be a combination image of two or more of a whole circumferential view image, a front view image, and a rear view image. Further alternatively, the guidance image may be a synthetic image in which stop icons, a moving area, a parking target frame, and a backward movement start frame are overlapped on one of a whole circumferential view image, a front view image, and a rear view image.

In the present exemplary embodiment, the parking assistance process described above is realized through execution of a parking assistance program by controller 11. However, it can be realized by using a hardware circuit. The parking assistance program can be provided to controller 11 by being stored on a computer-readable storage medium such as a magnetic disk, an optical disk, a flash memory, or the like. The parking assistance program can also be provided by being downloaded via a communication line such as the Internet.

It should be construed that the exemplary embodiment disclosed herein is illustrative in all aspects, and is not restrictive. The scope of the present disclosure is represented by the scope of the claims and not by the above description, and it is intended that all modifications within the sense and scope equivalent to the claims are involved in the scope of the present disclosure.

The parking assistance device, the parking assistance method, and the parking assistance program according to the present disclosure are preferable in a case of parking a vehicle at a target parking position.

What is claimed is:

1. A control method of a driving assistance device configured to be mounted in a vehicle comprising:
   receiving a first ambient image of the vehicle, the first ambient image captured by a plurality of cameras mounted in the vehicle;
   displaying a first overhead image of the vehicle on a screen of a display mounted in the vehicle, at least a part of the first overhead image corresponding to the first ambient image, the first overhead image including a vehicle image indicating the vehicle, a first line segment overlapping the first overhead image on the screen, a second line segment overlapping the first overhead image on the screen, the first line segment having a first end point and a second end point, the first line segment arranged along a traveling direction of the vehicle on the screen, the first end point being farther from the vehicle image than the second end point on the screen, the second line segment having a third end point and a fourth end point, the second line segment arranged along the traveling direction of the vehicle on the screen, the third end point being farther from the vehicle than the fourth end point on the screen, and the first line segment and the second line segment having a first distance between the first end point and the third end point on the screen, when a steering angle of the vehicle equals to a first angle from a reference angle;
   receiving a second ambient image of the vehicle, the second ambient image captured by the plurality of cameras mounted in the vehicle; and
   displaying a second overhead image of the vehicle on the screen, at least a part of the second overhead image corresponding to the second ambient image, the second overhead image including the vehicle image, a third line segment overlapping the second overhead image on the screen, a fourth line segment overlapping the second overhead image on the screen, the third line segment having a fifth end point and a sixth end point, the third line segment arranged along the traveling direction of the vehicle on the screen, the fifth end point being farther from the vehicle image than the sixth end point on the screen, the fourth line segment having a seventh end point and a eighth end point, the fourth line segment arranged along the traveling direction of the vehicle on the screen, the seventh end point being farther from the vehicle than the eighth end point, and the third line segment and the fourth line segment having a second distance between the fifth end point and the seventh end point on the screen, when the steering angle of the vehicle equals to a second angle from the reference angle, the second distance being greater than the first distance, when the steering angle of the vehicle equals to the second angle from the reference angle.

2. The control method of the driving assistance device according to claim 1, wherein
the reference angle corresponds to a neutral state of the steering wheel directing the vehicle to travel in a straight line.

3. The control method of the driving assistance device according to claim 1, wherein
the displaying the first overhead image includes displaying, on the screen, the first overhead image with a first steering angle indicator indicating the first angle, and
the displaying the second overhead image includes displaying, on the screen, the second overhead image with a second steering angle indicator indicating the second angle.

4. The control method of the driving assistance device according to claim 1, wherein
the displaying the first overhed image includes displaying the first overhead image of the vehicle on the screen, when the steering angle of the vehicle equals to the first angle, while the vehicle is traveling from a parking start position to a target parking position, and
the displaying the second overhead image includes displaying the second overhead image of the vehicle on the screen, when the steering angle of the vehicle equals to the second angle, while the vehicle is traveling from the parking start position to the target parking position.

5. The control method of the driving assistance device according to claim 1, further comprising:
receiving a third ambient image of the vehicle, the third ambient image captured by the plurality of cameras mounted in the vehicle;
displaying a third overhead image of the vehicle on the screen, at least a part of the third overhead image corresponding to the third ambient image, the third overhead image including the vehicle image, a fifth line segment overlapping the third overhead image on the screen, a sixth line segment overlapping the third overhead image on the screen, the fifth line segment having a ninth end point and a tenth end point, the fifth line segment arranged along the traveling direction of the vehicle on the screen, the ninth end point being farther from the vehicle than the tenth end point, the sixth line segment having an eleventh end point and a twelfth end point, the sixth line segment arranged along the traveling direction of the vehicle on the screen, the eleventh end point being farther from the vehicle than the twelfth end point, and the fifth line segment and the sixth line segment having a third distance between the ninth end point and the eleventh end point when the steering angle of the vehicle equals to a third angle from the reference angle; and
changing the third distance based on a change in the steering angle of the vehicle.

6. The control method of the driving assistance device according to claim 5, wherein
when a difference between the steering angle of the vehicle and the reference angle increases in a clockwise direction, the third distance becomes longer rightward facing one longitudinal direction of the vehicle image, on the screen.

7. The control method of the driving assistance device according to claim 1, wherein
each of the first overhead image and the second overhead image is displayed on a first part of the screen of the display, and
a front view or a rear view from one of the plurality of cameras is displayed on a second part of the screen of the display, the second part of the display being distinct from the first part of the display.

8. The control method of the driving assistance device according to claim 1, further comprising displaying a seventh line segment between the first end point and the third end point.

* * * * *